US012405726B2

(12) United States Patent
Halaharivi et al.

(10) Patent No.: US 12,405,726 B2
(45) Date of Patent: Sep. 2, 2025

(54) MANAGING WRITE COMMAND EXECUTION DURING A POWER FAILURE IN A MEMORY SUB-SYSTEM

(71) Applicant: Micron Technology, Inc., Boise, ID (US)

(72) Inventors: Raja V.S. Halaharivi, Gilroy, CA (US); Yoav Weinberg, Toronto (CA)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/606,794

(22) Filed: Mar. 15, 2024

(65) Prior Publication Data

US 2024/0319873 A1    Sep. 26, 2024

Related U.S. Application Data

(60) Provisional application No. 63/492,042, filed on Mar. 24, 2023.

(51) Int. Cl.
*G06F 12/00* (2006.01)
*G06F 3/06* (2006.01)
*G06F 12/02* (2006.01)

(52) U.S. Cl.
CPC .......... *G06F 3/0608* (2013.01); *G06F 3/0659* (2013.01); *G06F 3/0679* (2013.01); *G06F 12/0246* (2013.01); *G06F 2212/7201* (2013.01)

(58) Field of Classification Search
CPC .... G06F 3/0608; G06F 3/0659; G06F 3/0679; G06F 12/0246; G06F 2212/7201; G06F 2212/1032
USPC ........................................................ 711/103
See application file for complete search history.

(56) References Cited

U.S. PATENT DOCUMENTS

| | | | |
|---|---|---|---|
| 10,990,526 B1 * | 4/2021 | Lam | G06F 12/0246 |
| 2019/0065108 A1 * | 2/2019 | Miller | G11C 16/30 |
| 2022/0187999 A1 * | 6/2022 | Lam | G06F 3/0625 |
| 2022/0276791 A1 * | 9/2022 | Miller | G06F 3/0679 |
| 2023/0073518 A1 * | 3/2023 | Kao | G06F 3/0679 |

* cited by examiner

*Primary Examiner* — Mardochee Chery
(74) *Attorney, Agent, or Firm* — Lowenstein Sandler LLP (57) ABSTRACT

A system includes a memory device and a processing device, operatively coupled with the memory device, to perform operations including: detecting an asynchronous power loss event at the memory device; receiving, from a host system, a memory access command; determining that a size of the memory access command satisfies a threshold criterion, wherein the threshold criterion corresponds to an atomic write unit size; responsive to determining that the size of the memory access command satisfies the threshold criterion, executing the memory access command using a hardware component of the memory device; and responsive to executing the memory access command, notifying the host system of completion of execution of the memory access command.

20 Claims, 6 Drawing Sheets

MANAGING WRITE COMMAND EXECUTION DURING A POWER FAILURE IN A MEMORY SUB-SYSTEM

RELATED APPLICATIONS

This application claims the priority and benefit of U.S. Provisional Application No. 63/492,042, filed on Mar. 24, 2023, the entire content of which is incorporated by reference herein.

TECHNICAL FIELD

Embodiments of the disclosure relate generally to memory sub-systems, and more specifically, relate to managing write command execution during a power failure in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing write command execution during a power failure in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

Memory access operations can be performed by the memory sub-system. The memory access operations can be host-initiated operations. For example, the host system can initiate a memory access operation (e.g., write, read, erase, etc.) on a memory sub-system. The host system can send memory access commands (e.g., write command, read command) to the memory sub-system, such as to store data in the memory device at the memory sub-system and to read data from the memory device of the memory sub-system.

The host system can use a logical address space to access the memory device. The logical address space can identify a logical unit, such as a logical block. For some types of memory devices, a logical block is the smallest write/read unit. For example, the size of data in a logical block can be 512 bytes, 4096 bytes (4 KB), etc., depending on the specification of the memory device. In certain memory devices, a logical block can be a group of logical pages. A logical page is an abstraction of physical pages. A memory sub-system can define a logical page to be equal to a particular unit of physical storage (e.g., a physical page, a physical block, etc.). A logical block address (LBA) is an identifier of a logical block. In an addressing scheme for logical blocks, logical blocks can be located using an integer index, with the first block being LBA 0, the second being LBA 1, and so on.

The logical address space can be managed using a translation unit (TU). For certain memory devices, a TU is a base granularity of data managed by the memory device. A TU can include a predefined number of logical units (e.g., logical pages, logical blocks, etc.). In some examples, a TU is predefined to include one logical block, so the size of the TU equals the size of the logical block. In some examples, a TU is predefined to include multiple logical blocks. In that case, the size of the TU is a multiple of the size of the logical blocks.

In one example, a TU can be predefined to include one 512 byte logical block, so the size of the TU is 512 bytes. In another example, a TU can be predefined to include one 4 KB logical block, size the size of the TU is 4 KB. In another example, a TU can be predefined to include eight 512 byte logical blocks, totaling a size of (8*512) bytes, or 4096 bytes (4 KB). In the previous example, the size of the TU is 4 KB. The logical address space can be divided using a number of TUs (e.g., 4 KB size TUs), where each TU can include eight logical blocks. In one addressing scheme for TUs, TUs can be located using an integer index, with the first TU being TU 0, the second TU being TU 1, and so on. In an example, TU 0 can include eight LBAs starting from LBA 0 and ending at LBA 7. TU 1 can include the next eight LBAs, starting at LBA 8 and ending at LBA 15, and so on. The starting address and the ending address of the logical unit (e.g., logical block, logical page, etc.) can define the boundaries of the TU.

When the host system requests to access data (e.g., read data, write data), the host system can send a memory access command to the memory device directed to the logical address space. For example, the host system can provide logical address information (e.g., logical block address (LBA), namespace) identifying the location where the data is to be stored at or read from. Since the data from the host system is eventually to be stored at a physical address within the memory device, the memory sub-system controller can translate the logical address information to a corresponding TU. The memory sub-system controller maintains a logical to physical (L2P) translation map, or table, to identify the physical location where the data corresponding to each logical address resides. The L2P table can include a number of L2P entries. Each entry in an L2P table can identify a physical location corresponding to a particular TU. The L2P table tracks every TU that has been written to the memory device by maintaining its physical address. For example, an L2P entry can include an index of the TU (e.g., TU 0, TU 1, etc.), a corresponding range of physical addresses, some metadata, such as a flag that indicates whether the data at an address is valid or invalid, etc. The L2P table can be maintained by the firmware of the memory sub-system controller and is stored on one or more non-volatile memory devices of the memory sub-system. The L2P table can be at least partially cached by one or more volatile memory devices of the memory sub-system.

The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), and the like. For simplicity, where "data" is referred to hereinafter, such data can be understood to refer to at least host data, but can also refer to other data such as system data.

During the operation of a memory device, the memory sub-system can experience loss of power, such as an asynchronous power loss (APL) event. APL is a sudden and unexpected power loss, including a power loss that is not preceded by a shutdown notification from the host system. Memory devices are designed to handle APL events so that data stored in volatile memory is not lost. In certain memory devices, the host system can send memory access commands to the memory sub-system that are yet to be executed or are only partially executed when the memory sub-system experiences a power loss. In such cases, a firmware component of a memory device is configured to execute a memory access command that is equal to or less than an atomicity size (also referred to herein as an atomic write unit size). An atomic write unit size can be a preconfigured size (e.g., configured during manufacturing of the memory device based on offline testing and media characterization). For example, the atomic write unit size can be 128K, 256K, 512K, 1M, 4M, etc. The firmware component determines whether the memory access command can be executed (e.g., that the memory access command is equal to or less than the atomic write unit size) and then communicates with a hardware component (e.g., a hardware automation component) of the memory device to execute the memory access operation. Once the memory access command is executed, the firmware component updates the L2P table and the host system is notified that the memory access command has been executed. However, if the memory access command is greater than the atomic write unit size, then the memory access command is not executed. This can result in a waste of memory space in the memory sub-system, as there can be enough memory space to execute and store portions of the memory access command (e.g., portions of data of the memory access command) despite there not being enough memory space to execute the entire memory access command. Further, by having firmware component first determine that the memory access command is equal to or less than the atomic write unit size before communicating with the hardware to execute the memory access command, there can be an impact on system performance by increasing the amount of time and resources the memory sub-system takes to execute the memory access command.

Aspects of the present disclosure address the above and other deficiencies by managing write command execution during a power failure in a memory sub-system. Implementing the managing of command execution during a power failure in a memory sub-system can be used to automate the execution of a memory access command during a power failure by a hardware component (e.g., a hardware automation component) of the memory sub-system if the memory access command satisfies the atomicity size (e.g., is less than or equal to the atomic write unit size). Instead of having the memory access command go to a firmware component to determine whether the memory access command satisfies the atomicity size and/or that the memory access command can be executed by the hardware component (e.g., a hardware automation component), the execution of the memory access command can be automated by the hardware component (e.g., a hardware automation component). The hardware component (e.g., a hardware automation component) can determine whether the memory access command satisfies the atomicity size and, if so, execute the memory access command. If the hardware component (e.g., a hardware automation component) determines that the memory access command does not satisfy the atomicity size (e.g., is greater than the atomic write unit size), the hardware component (e.g., a hardware automation component) can interrupt the firmware component. The firmware component can segment the memory access command into segments (e.g., portions of data) that each satisfy the atomicity size. As such, there can be an improvement in system performance by automating the execution of the memory access command by the hardware component (e.g., a hardware automation component) without firmware involvement if the memory access command satisfies the atomicity size. Further, there can be less wasted memory space in the memory sub-system by having the firmware component segment the memory access command into segments that can each satisfy the atomicity size and having the hardware component (e.g., a hardware automation component) execute each of the segments of the memory access command.

To implement managing write command execution during a power failure in a memory sub-system as described herein, a memory sub-system controller can detect a power loss event (e.g., an APL event) occurring at a memory device. The memory sub-system controller can include a hardware component (e.g., a hardware automation component) and a firmware component. The memory sub-system controller can receive a memory access command (e.g., a write command) from a host system. The memory sub-system controller can determine that a size of the memory access command satisfies a threshold criterion. In some embodiments, determining that the size of the memory access command satisfies the threshold criterion can include determining that the size of the memory access command is less than or equal to an atomic write unit size. The atomic write unit size can be a preconfigured value as described herein. In some embodiments, in response to determining that the size of the memory access command satisfies the threshold criterion (e.g., the size of the memory access command is less than or equal to the atomic write unit size), the memory sub-system controller can allocate one or more resources for executing the memory access command. Allocating the one or more resources can include allocating internal memory resources that are required to execute the memory access command. The memory sub-system controller can execute the memory access command using a hardware component (e.g., a hardware automation component) of the memory device. In response to executing the memory access command, the memory sub-system controller can notify the host system that the memory access command has been executed.

In some embodiments, the memory sub-system controller can determine that the size of the memory access command does not satisfy the threshold criterion. Determining that the size of the memory access command does not satisfy the threshold criterion can include determining that the size of the memory access command is greater than the atomic write unit size. In some embodiments, in response to determining that the size of the memory access command does not satisfy the threshold criterion, the memory sub-system controller can send an interrupt message to a firmware component of the memory device. The firmware component can segment the memory access command into a set of segments (e.g., a set of segments of a fixed size). The memory sub-system controller can receive the set of segments of the memory access command from the firmware component. The memory sub-system controller can execute the set of segments of the memory access command using the hardware component (e.g., a hardware automation component) of the memory device. Further details regarding implementing managing write command execution during a power failure in a memory sub-system are described herein below with reference to FIGS. 2-4.

Advantages of the present disclosure include, but are not limited to, improved memory device system performance and less wasted space in the memory sub-system. By automating the execution of the memory access command by the hardware component (e.g., a hardware automation component) if the memory access command satisfies the atomicity size, the memory access command can be executed without involvement by the firmware component. Further, there can be less wasted space in the memory sub-system by having the firmware component segment the memory access command into segments that can each satisfy the atomicity size and having the hardware component (e.g., a hardware automation component) execute each of the segments of the memory access command.

Figure 1:
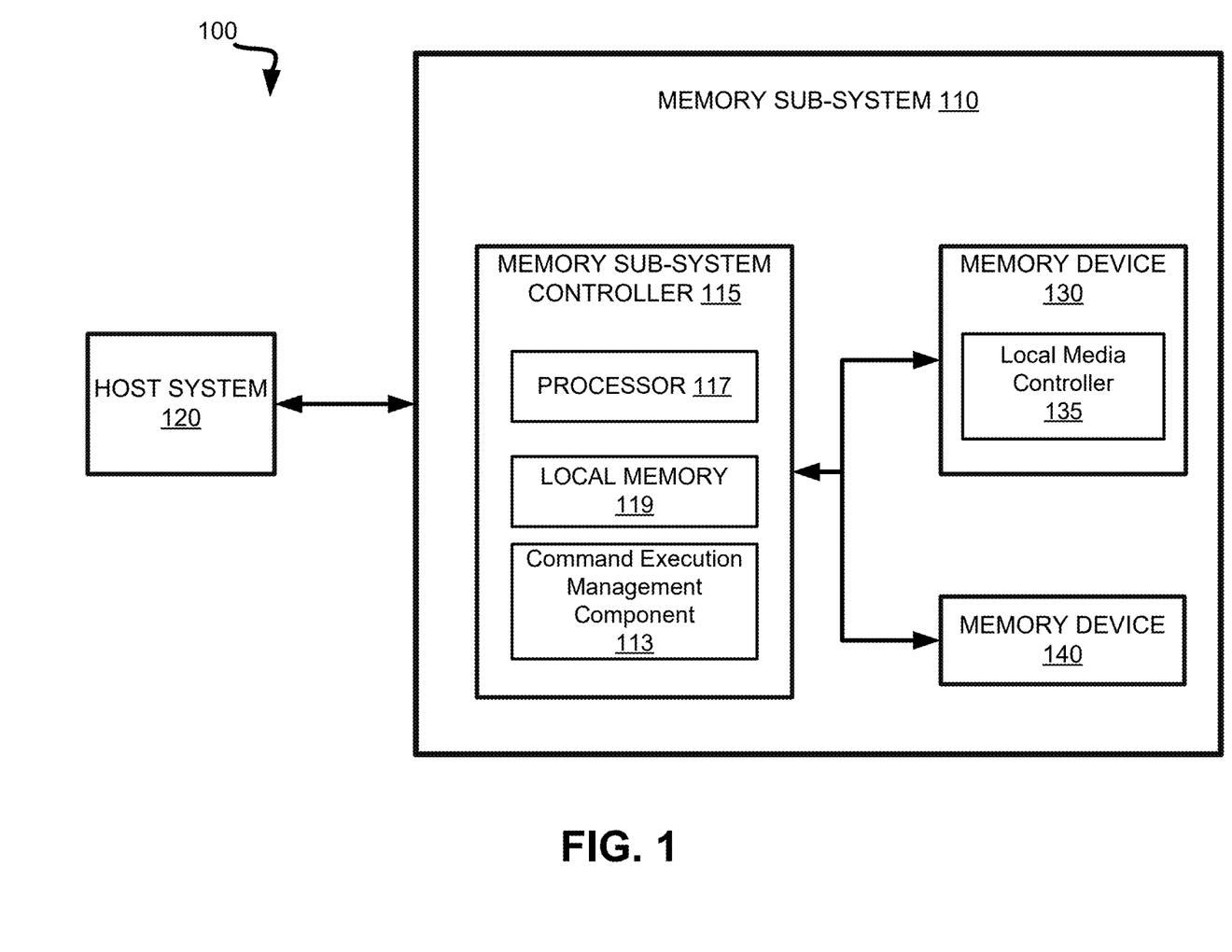
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a command execution management component 113 that can be used to implement managing write command execution during a power failure in a memory sub-system, in accordance with embodiments of the present disclosure. In some embodiments, the memory sub-system controller 115 includes at least a portion of the command execution management component 113. In some embodiments, the command execution management component 113 is part of the host system 110, an application, or an operating system. In other embodiments, local media controller 135 includes at least a portion of command execution management component 113 and is configured to perform the functionality described herein.

In some embodiments, the command execution management component 113 can detect an asynchronous power loss event occurring at a memory device. The command execution management component 113 can receive a memory access command (e.g., a write command) from a host system. The command execution management component 113 can determine that a size of the memory access command satisfies a threshold criterion. In some embodiments, determining that the size of the memory access command satisfies the threshold criterion can include determining that the size of the memory access command is less than or equal to an atomic write unit size. The atomic write unit size can be a preconfigured value as described herein. In some embodiments, in response to determining that the size of the memory access command satisfies the threshold criterion (e.g., the size of the memory access command is less than or equal to the atomic write unit size), the command execution management component 113 can allocate one or more resources for executing the memory access command. Allocating the one or more resources can include allocating internal memory resources that are required to execute the memory access command. The command execution management component 113 can execute the memory access command using a hardware component (e.g., a hardware automation component) of the memory device. In response to executing the memory access command, the command execution management component 113 can notify the host system that the memory access command has been executed.

In some embodiments, the command execution management component 113 can determine that the size of the memory access command does not satisfy the threshold criterion. Determining that the size of the memory access command does not satisfy the threshold criterion can include determining that the size of the memory access command is greater than the atomic write unit size. In some embodiments, in response to determining that the size of the memory access command does not satisfy the threshold criterion, the command execution management component 113 can send an interrupt message to a firmware component of the memory device. The firmware component can segment the memory access command into a set of segments (e.g., a set of segments of a fixed size). The command execution management component 113 can receive the set of segments of the memory access command from the firmware component. The command execution management component 113 can execute the set of segments of the memory access command using the hardware component (e.g., a hardware automation component) of the memory device.

Further details regarding implementing managing write command execution during a power failure in a memory sub-system are described herein below with reference to FIGS. 2-4.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
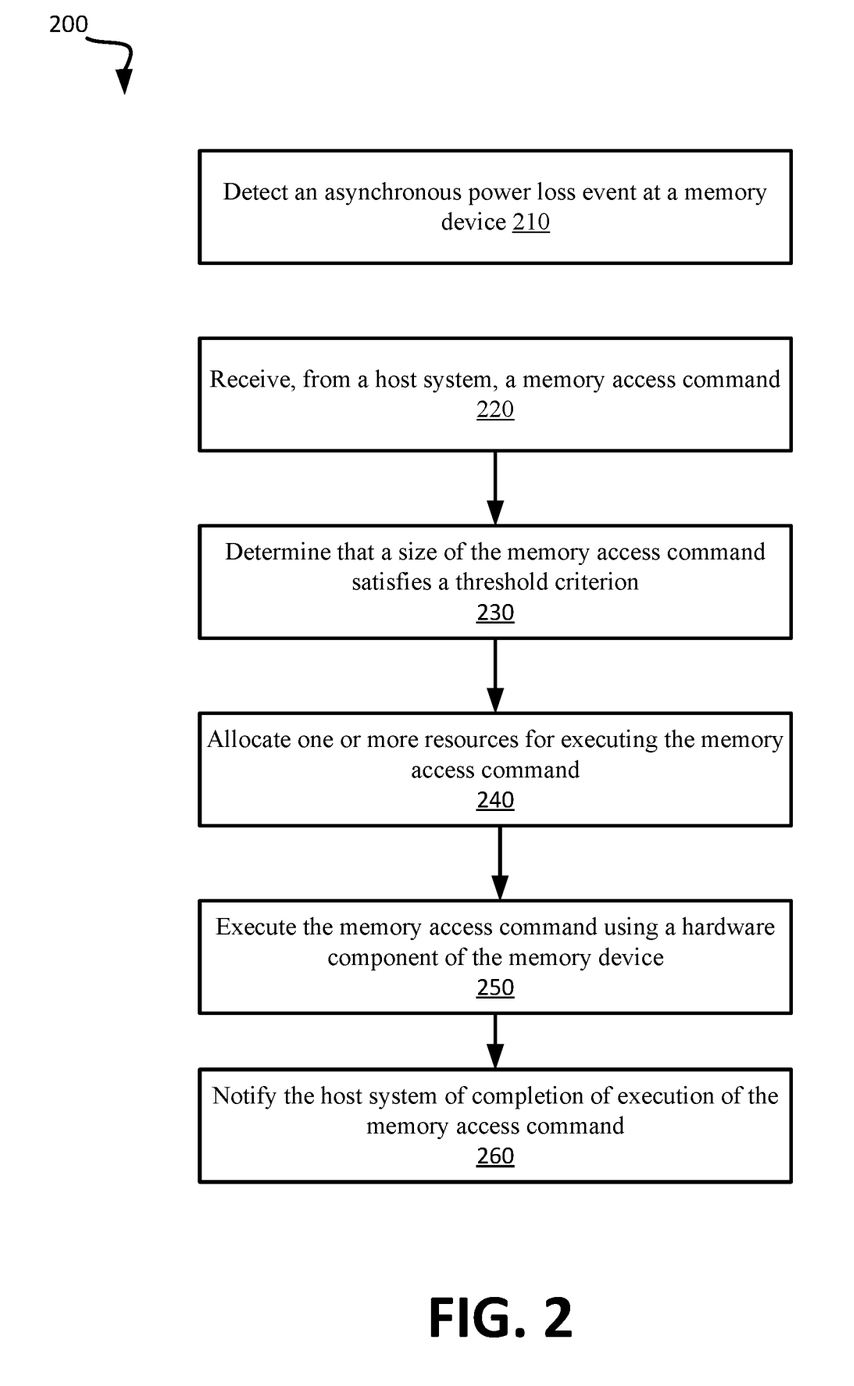
FIG. 2 is a flow diagram illustrating an example of a method to implement managing write command execution during a power failure in a memory sub-system, in accordance with some embodiments of the present disclosure.

FIG. 2 is a flow diagram illustrating an example of a method 200 to implement managing write command execution during a power failure in a memory sub-system, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the command execution management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic detects a power loss event at a memory device, such as a memory device 130 of FIG. 1. In some embodiments, detecting the power loss event can include detecting an asynchronous power loss (APL) event. Detecting the power loss event can include receiving a notification (e.g., message) at a memory sub-system controller (e.g., the memory sub-system controller 115 of FIG. 1) from a host device (e.g., the host system 120 of FIG. 1). The message can include a status update of a power mode of the memory device.

At operation 220, the processing logic receives a memory access command. In some embodiments, the memory access command is a write command. In some embodiments, the memory access command is a read command. The processing logic can receive the memory access command from the host device (e.g., the host system 120 of FIG. 1). For example, the memory access command can receive the memory access command via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports.

At operation 230, the processing logic (e.g., the hardware component of the memory device) determines that a size of the memory access command satisfies a threshold criterion. In some embodiments, determining that the size of the memory access command satisfies the threshold criterion can include determining that the size of the memory access command is less than or equal to an atomic write unit size. The atomic write unit size can be a preconfigured value assigned during manufacturing of the memory device based on offline testing and media characterization of the memory device. In some embodiments, the processing logic can identify the size of the memory access command using the logical address information included in, e.g., metadata associated with the memory access command.

At operation 240, the processing logic (e.g., the hardware component of the memory device) allocates one or more resources for executing the memory access command. In some embodiments, allocating the one or more resources for executing the memory access command can be in response to determining, at operation 230, that the size of the memory access command satisfies the threshold criterion (e.g., is less than or equal to the atomic write unit size). Allocating the one or more resources can include allocating internal memory resources that are required to execute the memory access command.

At operation 250, the processing logic executes the memory access command. In some embodiments, the processing logic executes the memory access command using the hardware component (e.g., a hardware automation component) of the memory device. In some embodiments, executing the memory access command can include identifying a logical block address of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the memory access command by executing each TU of the one or more TUs using the pointer of each TU. For example, the processing logic can write the data identified by a particular TU to the location in the memory device identified by the pointer of the particular TU. In some embodiments, the processing logic can determine that each TU of the one or more TUs has been executed. For example, the processing logic can identify that a final TU of the one or more TUs has been executed. In response to determining that each TU of the one or more TUs has been executed, the processing logic can send a notification of completion of execution of the one or more TUs. In some embodiments, sending the notification of completion can include sending an end of command message to the firmware component. In some embodiments, sending the notification of completion can include indicating, using a bit flag of data identified by the memory access command, that the one or more TUs have been executed. In some embodiments, the processing logic (e.g., the hardware component) can send an interrupt message to the firmware component. The processing logic can send the interrupt message to the firmware component in response to determining that each TU of the one or more TUs has been executed. In some embodiments, the interrupt message can include data referencing the one or more TUs executed and/or the memory access command. In some embodiments, the interrupt message is an electrical signal that interrupts the firmware component. In some embodiments, the interrupt message can be sent using an interrupt routine. In some embodiments, in response to receiving the interrupt message, the firmware component can update the L2P table as described herein with the execution of the memory access command.

At operation 260, the processing logic (e.g., the hardware component) notifies the host device of completion of execution of the memory access command at operation 250. In some embodiments, notifying the host device of the completion of the execution of the memory access command can include updating an entry of a data structure coupled to and/or otherwise associated with the host device with a notification of the completion of the execution. In some embodiments, updating the entry of the data structure can include updating the entry with an identifier of the memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

Figure 3:
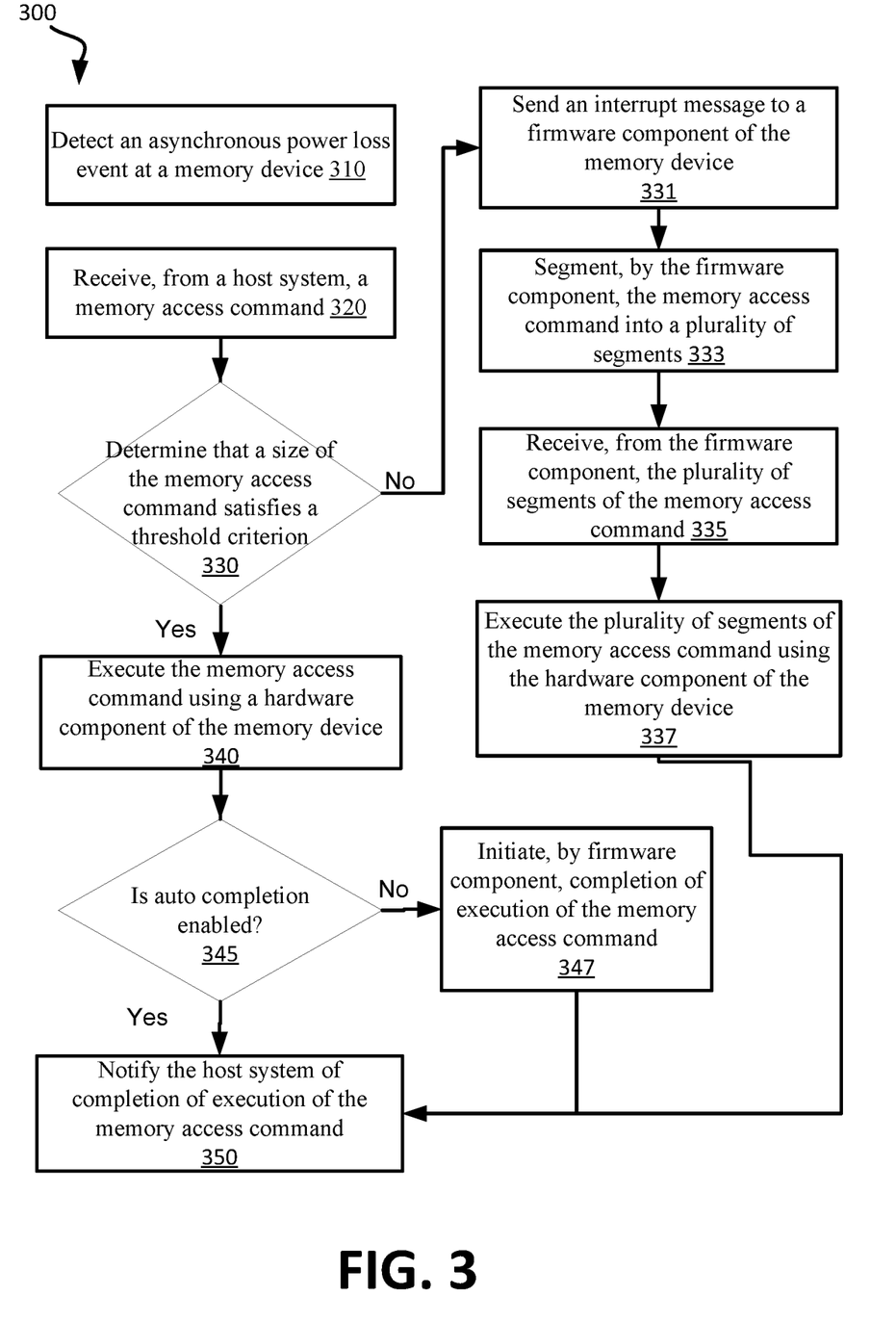
FIG. 3 is a flow diagram illustrating an example of a method to implement managing write command execution during a power failure in a memory sub-system, in accordance with some embodiments of the present disclosure.

FIG. 3 is a flow diagram of an example method 300 to implement managing write command execution during a power failure in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the command execution management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic detects a power loss event at a memory device, such as a memory device 130 of FIG. 1. In some embodiments, detecting the power loss event can include detecting an asynchronous power loss (APL) event. Detecting the power loss event can include receiving a notification (e.g., message) at a memory sub-system controller (e.g., the memory sub-system controller 115 of FIG. 1) from a host device (e.g., the host system 120 of FIG. 1). The message can include a status update of a power mode of the memory device.

At operation 320, the processing logic receives a memory access command. In some embodiments, the memory access command is a write command. In some embodiments, the memory access command is a read command. The processing logic can receive the memory access command from the host device (e.g., the host system 120 of FIG. 1). For example, the memory access command can receive the memory access command via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports.

At operation 330, the processing logic (e.g., the hardware component of the memory device) determines that a size of the memory access command satisfies a threshold criterion. In some embodiments, determining that the size of the memory access command satisfies the threshold criterion can include determining that the size of the memory access command is less than or equal to an atomic write unit size. The atomic write unit size can be a preconfigured value assigned during manufacturing of the memory device based on offline testing and media characterization of the memory device. In some embodiments, the processing logic can identify the size of the memory access command using the logical address information included in, e.g., metadata associated with the memory access command.

At operation 340, in response to determining that the size of the memory access command satisfies the threshold criterion, the processing logic executes the memory access command. In some embodiments, the processing logic executes the memory access command using the hardware component (e.g., a hardware automation component) of the memory device. In some embodiments, executing the memory access command can include allocating one or more internal memory resources that are required to execute the memory access command. In some embodiments, executing the memory access command can include identifying a logical block address of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the memory access command by executing each TU of the one or more TUs using the pointer of each TU. For example, the processing logic can write the data identified by a particular TU to the location in the memory device identified by the pointer of the particular TU. In some embodiments, the processing logic can determine that each TU of the one or more TUs has been executed. For example, the processing logic can identify that a final TU of the one or more TUs has been executed. In response to determining that each TU of the one or more TUs has been executed, the processing logic can send a notification of completion of execution of the one or more TUs. In some embodiments, sending the notification of completion can include sending an end of command message to the firmware component. In some embodiments, sending the notification of completion can include indicating, using a bit flag of data identified by the memory access command, that the one or more TUs have been executed. In some embodiments, the processing logic (e.g., the hardware component) can send an interrupt message to the firmware component. The processing logic can send the interrupt message to the firmware component in response to determining that each TU of the one or more TUs has been executed. In some embodiments, the interrupt message can include data referencing the one or more TUs executed and/or the memory access command. In some embodiments, the interrupt message is an electrical signal that interrupts the firmware component. In some embodiments, the interrupt message can be sent using an interrupt routine. In some embodiments, in response to receiving the interrupt message, the firmware component can update the L2P table as described herein with the execution of the memory access command.

At operation 345, the processing logic determines whether an auto completion (e.g., a hardware auto completion configuration) is enabled for the memory access command. In some embodiments, determining whether an auto completion is enabled can include identifying an auto completion configuration mode associated with the memory access command (e.g., in metadata associated with the memory access command).

At operation 347, in response to determining that the auto completion is disabled at operation 345, the processing logic initiates, using the firmware component, completion of execution of the memory access command.

At operation 350, the processing logic notifies the host device of completion of execution of the memory access command at operation 340. In some embodiments, notifying the host device of the completion of the execution of the memory access command can include updating an entry of a data structure coupled to and/or otherwise associated with the host device with a notification of the completion of the execution. In some embodiments, updating the entry of the data structure can include updating the entry with an identifier of the memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

At operation 331, in response to determining that the size of the memory access command does not satisfy the threshold criterion, the processing logic sends an interrupt message to the firmware component. In some embodiments, the interrupt message can include data referencing the memory access command. In some embodiments, the interrupt message is an electrical signal that interrupts the firmware component. In some embodiments, the interrupt message can be sent using an interrupt routine.

At operation 333, in response to receiving the interrupt message, the firmware component can segment the memory access command into a set of segments. In some embodiments, segmenting the memory access command into the set of segments can include segmenting the memory access command into one or more segments (e.g., portions), where each segment is equal to or less than a fixed size. In some embodiments, the fixed size can be defined as the atomicity size (e.g., atomic write unit size) as described herein.

At operation 335, the processing logic (e.g., the hardware component) receives the set of segments of the memory access command from the firmware component. In some embodiments, receiving the set of segments of the memory access command can include accessing one or more registers of the memory device, where the set of segments is stored by the firmware component in the one or more registers using an internal bus coupled to the memory device.

At operation 337, the processing logic executes the set of segments of the memory access command. In some embodiments, the processing logic executes the set of segments of the memory access command using the hardware component (e.g., a hardware automation component) of the memory device. In some embodiments, executing the set of segments of the memory access command can include allocating one or more internal memory resources that are required to execute the set of segments of the memory access command. In some embodiments, executing the set of segments of the memory access command can include identifying a logical block address of each segment of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the set of segments of the memory access command by executing each TU of the one or more TUs using the pointer of each TU. For example, the processing logic can write the data identified by a particular TU to the location in the memory device identified by the pointer of the particular TU. In some embodiments, the processing logic can determine that each TU of the one or more TUs has been executed. For example, the processing logic can identify that a final TU of the one or more TUs has been executed. In response to determining that each TU of the one or more TUs has been executed, the processing logic can send a notification of completion of execution of the one or more TUs. In some embodiments, sending the notification of completion can include sending an end of command message to the firmware component. In some embodiments, sending the notification of completion can include indicating, using a bit flag of data identified by each segment of the memory access command and/or the entire memory access command, that the one or more TUs have been executed. In some embodiments, the processing logic (e.g., the hardware component) can send an interrupt message to the firmware component. The processing logic can send the interrupt message to the firmware component in response to determining that each TU of the one or more TUs has been executed. In some embodiments, the interrupt message can include data referencing the one or more TUs executed and/or the memory access command. In some embodiments, the interrupt message is an electrical signal that interrupts the firmware component. In some embodiments, the interrupt message can be sent using an interrupt routine. In some embodiments, in response to receiving the interrupt message, the firmware component can update the L2P table as described herein with the execution of the set of segments of the memory access command. The processing logic can notify the host device of completion of the set of segments of the memory access command, e.g., as described herein with respect to operation 350.

Figure 4:
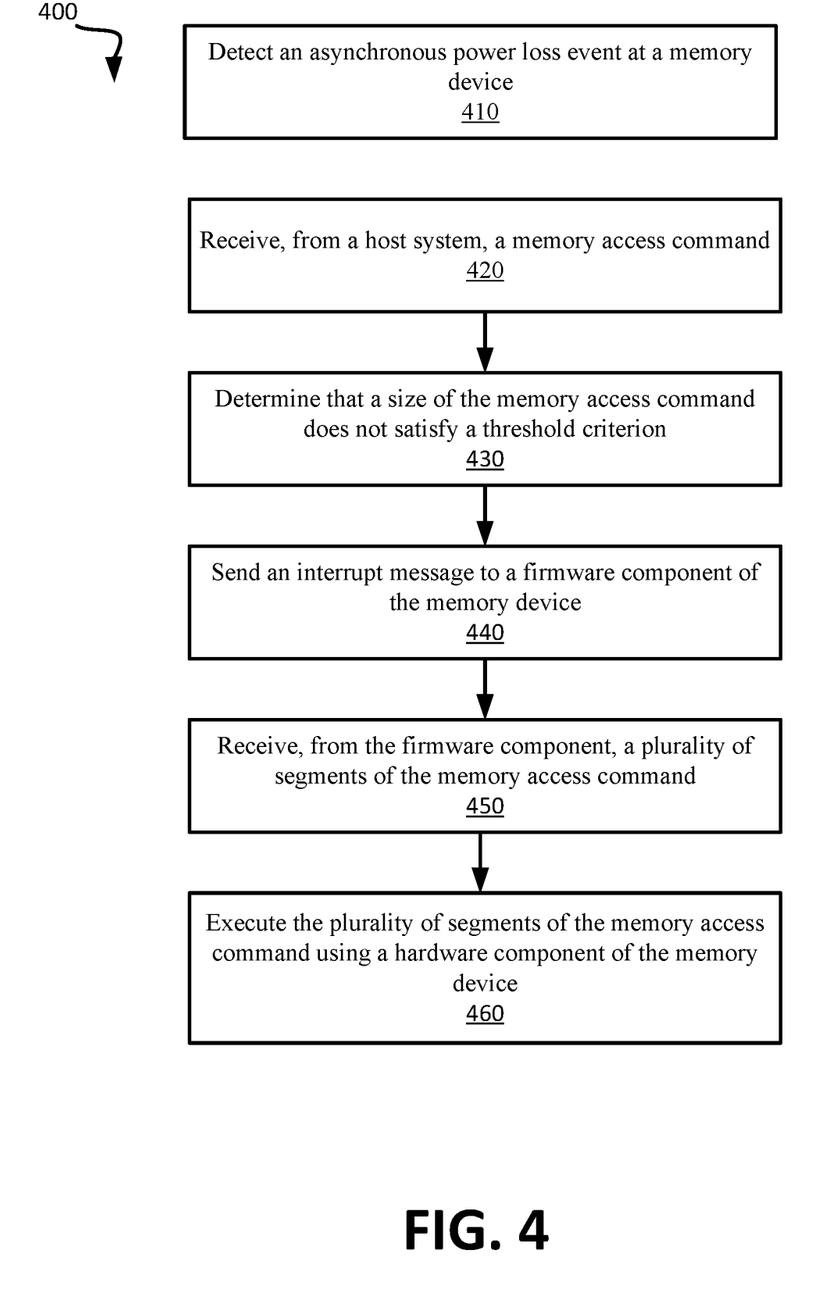
FIG. 4 is a flow diagram illustrating an example of a method to implement managing write command execution during a power failure in a memory sub-system, in accordance with some embodiments of the present disclosure.

FIG. 4 is a flow diagram illustrating an example of a method 400 to implement managing write command execution during a power failure in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the command execution management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic detects a power loss event at a memory device, such as a memory device 130 of FIG. 1. In some embodiments, detecting the power loss event can include detecting an asynchronous power loss (APL) event. Detecting the power loss event can include receiving a notification (e.g., message) at a memory sub-system controller (e.g., the memory sub-system controller 115 of FIG. 1) from a host device (e.g., the host system 120 of FIG. 1). The message can include a status update of a power mode of the memory device.

At operation 420, the processing logic receives a memory access command. In some embodiments, the memory access command is a write command. In some embodiments, the memory access command is a read command. The processing logic can receive the memory access command from the host device (e.g., the host system 120 of FIG. 1). For example, the memory access command can receive the memory access command via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports.

At operation 430, the processing logic (e.g., the hardware component of the memory device) determines that a size of the memory access command does not satisfy a threshold criterion. In some embodiments, determining that the size of the memory access command does not satisfy the threshold criterion can include determining that the size of the memory access command is greater than an atomic write unit size. The atomic write unit size can be a preconfigured value assigned during manufacturing of the memory device based on offline testing and media characterization of the memory device. In some embodiments, the processing logic can identify the size of the memory access command using the logical address information included in, e.g., metadata associated with the memory access command.

At operation 440, in response to determining that the size of the memory access command does not satisfy the threshold criterion, the processing logic sends an interrupt message to the firmware component. In some embodiments, the interrupt message can include data referencing the memory access command. In some embodiments, the interrupt message is an electrical signal that interrupts the firmware component. In some embodiments, the interrupt message can be sent using an interrupt routine.

At operation 450, the processing logic (e.g., the hardware component) receives a set of segments of the memory access command from the firmware component. In some embodiments, receiving the set of segments of the memory access command can include accessing one or more registers of the memory device, where the set of segments is stored by the firmware component in the one or more registers using an internal bus coupled to the memory device. In some embodiments, the set of segments of the memory access command can be segmented by the firmware component. Segmenting the memory access command into the set of segments can include segmenting the memory access command into one or more segments (e.g., portions), where each segment is equal to or less than a fixed size. In some embodiments, the fixed size can be defined as the atomicity size (e.g., atomic write unit size) as described herein.

At operation 460, the processing logic executes the set of segments of the memory access command. In some embodiments, the processing logic executes the set of segments of the memory access command using the hardware component (e.g., a hardware automation component) of the memory device. In some embodiments, executing the set of segments of the memory access command can include allocating one or more internal memory resources that are required to execute the set of segments of the memory access command. In some embodiments, executing the set of segments of the memory access command can include identifying a logical block address of each segment of the memory access command. The logical block address can be identified using the logical address information included in, e.g., metadata associated with the memory access command. The processing logic (e.g., the hardware component) can convert the logical block address into one or more translation units (TU). The processing logic can identify a pointer of each TU of the one or more TUs, where each pointer points to a location in the memory device of the data identified by each TU. The processing logic can execute the set of segments of the memory access command by executing each TU of the one or more TUs using the pointer of each TU. For example, the processing logic can write the data identified by a particular TU to the location in the memory device identified by the pointer of the particular TU. In some embodiments, the processing logic can determine that each TU of the one or more TUs has been executed. For example, the processing logic can identify that a final TU of the one or more TUs has been executed. In response to determining that each TU of the one or more TUs has been executed, the processing logic can send a notification of completion of execution of the one or more TUs. In some embodiments, sending the notification of completion can include sending an end of command message to the firmware component. In some embodiments, sending the notification of completion can include indicating, using a bit flag of data identified by each segment of the memory access command and/or the entire memory access command, that the one or more TUs have been executed. In some embodiments, the processing logic (e.g., the hardware component) can send an interrupt message to the firmware component. The processing logic can send the interrupt message to the firmware component in response to determining that each TU of the one or more TUs has been executed. In some embodiments, the interrupt message can include data referencing the one or more TUs executed and/or the memory access command. In some embodiments, the interrupt message is an electrical signal that interrupts the firmware component. In some embodiments, the interrupt message can be sent using an interrupt routine. In some embodiments, in response to receiving the interrupt message, the firmware component can update the L2P table as described herein with the execution of the set of segments of the memory access command.

In some embodiments, in response to executing the set of segments of the memory access command, the processing logic can notify the host device of completion of execution of the set of segments of the memory access command at operation 337. In some embodiments, notifying the host device of the completion of the execution of the set of segments of the memory access command can include updating an entry of a data structure coupled to and/or otherwise associated with the host device with a notification of the completion of the execution. In some embodiments, updating the entry of the data structure can include updating the entry with an identifier of each segment and/or the entire memory access command (e.g., the logical address information of the memory access command). In some embodiments, the processing logic can send an interrupt message to the host device. Sending the interrupt message to the host device can be performed in response to updating the entry of the data structure. In some embodiments, the interrupt message can include data indicating that the entry of the data structure has been updated. In some embodiments, the interrupt message is an electrical signal that interrupts the host device. In some embodiments, the interrupt message can be sent using an interrupt routine.

Figure 5:
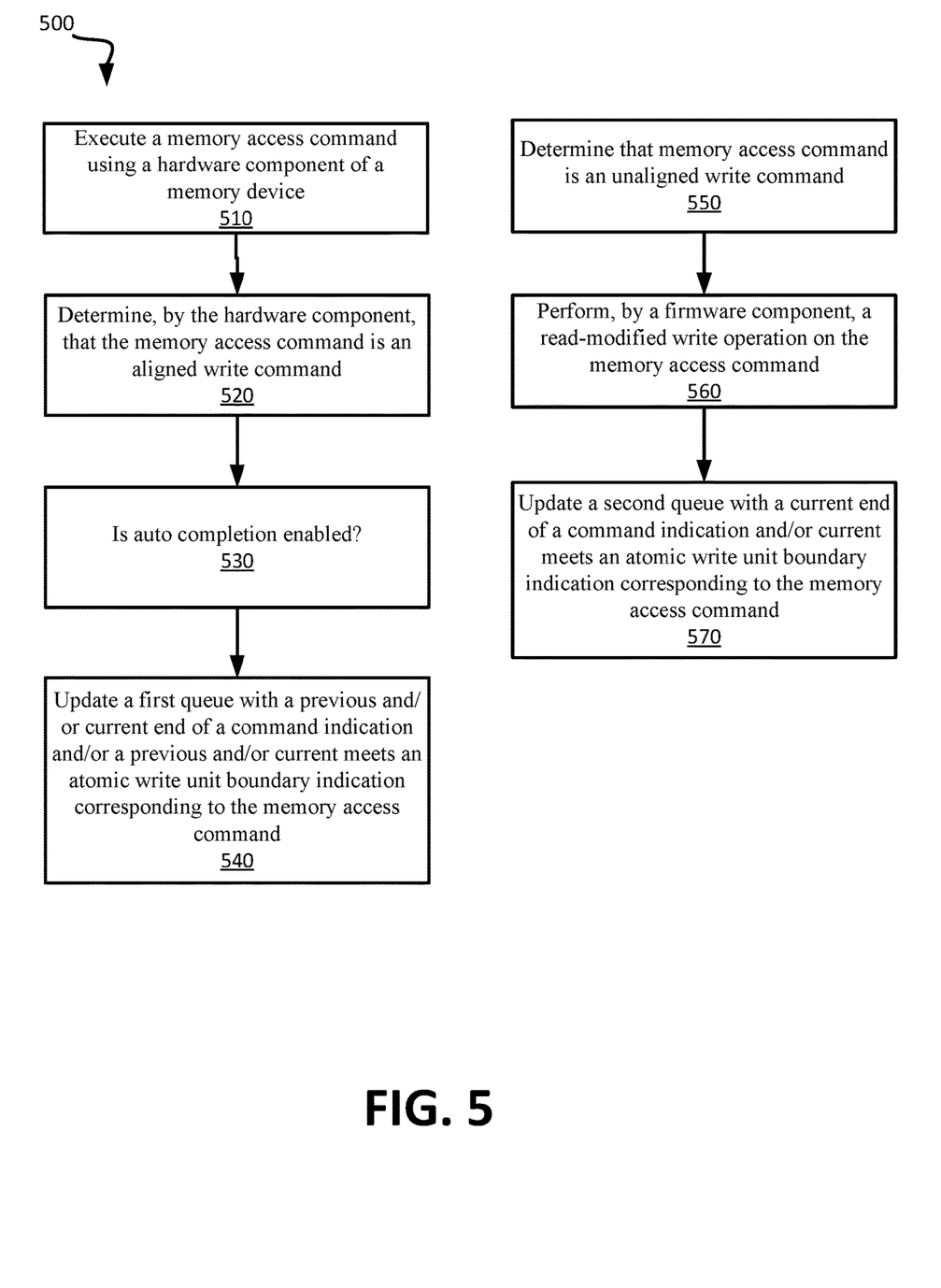
FIG. 5 is a flow diagram illustrating an example of a method to implement managing write command execution during a power failure in a memory sub-system, in accordance with some embodiments of the present disclosure.

FIG. 5 is a flow diagram illustrating an example of a method 500 to implement managing write command execution during a power failure in a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the command execution management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic can execute a memory access (e.g., write) command, e.g., as described herein with respect to operation 340 of FIG. 3.

At operation 520, the processing logic determines, using a hardware component of the memory sub-system (e.g., the memory sub-system 110 of FIG. 1) that the memory access command is an unaligned command. Determining that the memory access command is an unaligned command can be based on a starting LBA of the memory access command.

At operation 530, the processing logic determines whether auto completion for the memory access command is enabled, e.g., as described herein with respect to operation 345 of FIG. 3.

At operation 540, in response to determining that auto completion is enabled, the processing logic updates, using the hardware component, a data structure (e.g., a queue) with a current end of a command indication, a current meets an atomic write unit size indication, a previous end of a command indication, and/or a previous meets an atomic write unit size indication corresponding to the memory access command. In some embodiments, the data structure can be dedicated to storing aligned commands. In some embodiments, updating the data structure can include updating an entry of the data structure with the current end of a command indication, the current meets an atomic write unit size indication, the previous end of a command indication, and/or the previous meets an atomic write unit size indication corresponding to the memory access command. In some embodiments, each indication can be a bit associated with the memory access command. In some embodiments, an end of a command indication can indicate that the memory access command is greater than the atomic write unit size, as defined herein. In some embodiments, a meets an atomic write unit size indication can indicate that the memory access command is less than or equal to the atomic write unit size.

At operation 550, the processing logic determines that the memory access command is an aligned command. Determining that the memory access command is an aligned command can be based on a starting LBA of the memory access command.

At operation 560, in response to determining that the memory access command is an aligned command, the processing logic can perform, using a firmware component of the memory sub-system, a read-modified write operation. In some embodiments, performing the read-modified write operation can include reading a previous write value associated with the memory access command. In response, the firmware component can determine a current end of a command indication and/or a current meets an atomic write unit size indication for the memory access command.

At operation 570, the processing logic can update, using the firmware component, another data structure (e.g., a queue) with the current end of a command indication and/or the current meets an atomic write unit size indication. In some embodiments, the data structure can be dedicated to storing unaligned commands. In some embodiments, updating the data structure can include updating an entry of the data structure with the current end of a command indication and/or the current meets an atomic write unit size indication. In some embodiments, each indication can be a bit associated with the memory access command. In some embodiments, an end of a command indication can indicate that the memory access command is greater than the atomic write unit size, as defined herein. In some embodiments, a meets an atomic write unit size indication can indicate that the memory access command is less than or equal to the atomic write unit size.

Figure 6:
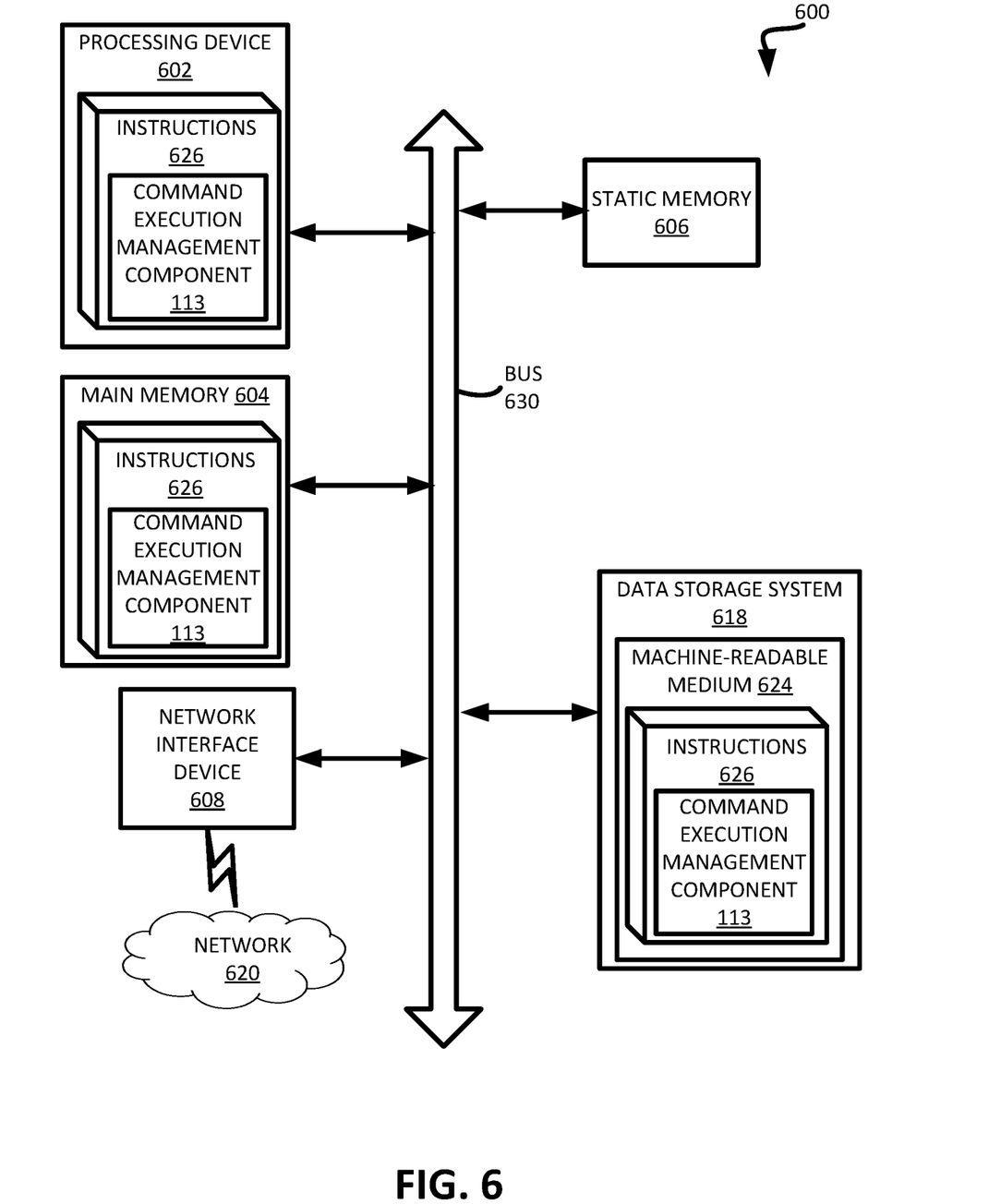
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the adaptive parameter component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a component (e.g., command execution management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
detecting an asynchronous power loss event at the memory device;
receiving, from a host system, a memory access command;
determining that a size of the memory access command satisfies a threshold criterion, wherein the threshold criterion corresponds to an atomic write unit size;
responsive to determining that the size of the memory access command satisfies the threshold criterion, allocating one or more resources for executing the memory access command;
executing the memory access command using a hardware component of the memory device; and
responsive to executing the memory access command, notifying the host system of completion of execution of the memory access command.

2. The system of claim 1, further comprising:
identifying a logical block address of the memory access command; and
converting the logical block address into one or more translation units (TUs).

3. The system of claim 1, wherein to execute the memory access command, the processing device is to perform operations further comprising:
converting the memory access command into one or more translation units (TUs);
identifying a pointer associated with each respective TU of the one or more TUs; and
executing a respective TU of the one or more TUs using the pointer associated with the respective TU.

4. The system of claim 3, further comprising:
determining that each TU of the one or more TUs is executed; and
sending a notification of completion of execution of the one or more TUs.

5. The system of claim 1, further comprising:
sending an interrupt message to a firmware component, wherein the interrupt message indicates the completion of execution of the memory access command.

6. The system of claim 1, further comprising:
determining that the size of the memory access command does not satisfy the threshold criterion;
responsive to determining that the size of the memory access command does not satisfy the threshold criterion, sending an interrupt message to a firmware component of the memory device;
receiving, from the firmware component, a plurality of segments of the memory access command; and
executing the plurality of segments of the memory access command using the hardware component of the memory device.

7. The system of claim 1, wherein to notify the host system of the completion of the execution of the memory access command, the processing device is to perform operations further comprising:
updating an entry of a data structure associated with the host system with a notification of the completion of the execution of the memory access command; and
sending an interrupt message to the host system, wherein the interrupt message indicates the updated entry of the data structure.

8. A method comprising:
detecting an asynchronous power loss event at a memory device;
receiving, from a host system of a memory device, a memory access command;
determining that a size of the memory access command does not satisfy a threshold criterion, wherein the threshold criterion comprises a threshold atomic write unit size;
responsive to determining that the size of the memory access command does not satisfy the threshold criterion, sending an interrupt message to a firmware component of the memory device;

receiving, from the firmware component, a plurality of segments of the memory access command; and executing the plurality of segments of the memory access command using a hardware component of the memory device.

9. The method of claim 8, further comprising:

identifying a logical block address of the memory access command; and converting the logical block address into one or more translation units (TUs).

10. The method of claim 8, wherein executing the plurality of segments of the memory access command further comprises:

converting each segment of the plurality of segments of the memory access command into one or more translation units (TUs);

identifying a pointer associated with each respective TU of the one or more TUs; and executing a respective TU of the one or more TUs using the pointer associated with the respective TU.

11. The method of claim 10, further comprising:

determining that each TU of the one or more TUs is executed; and sending a notification of completion of execution of the one or more TUs.

12. The method of claim 8, further comprising:

sending an interrupt message to a firmware component, wherein the interrupt message indicates completion of execution of the memory access command.

13. The method of claim 8, further comprising:

notifying the host system of completion of execution of the plurality of segments of the memory access command.

14. A non-transitory computer-readable storage medium comprising instructions that, when executed by a processing device, cause the processing device to perform operations comprising:

detecting an asynchronous power loss event at a memory device;

receiving, from a host system, a memory access command;

determining that a size of the memory access command satisfies a threshold criterion, wherein the threshold criterion corresponds to an atomic write unit size;

responsive to determining that the size of the memory access command satisfies the threshold criterion, allocating one or more resources for executing the memory access command;

executing the memory access command using a hardware component of the memory device; and responsive to executing the memory access command, notifying the host system of completion of execution of the memory access command.

15. The non-transitory computer-readable storage medium of claim 14, wherein the processing device is to perform operations further comprising:

identifying a logical block address of the memory access command; and converting the logical block address into one or more translation units (TUs).

16. The non-transitory computer-readable storage medium of claim 14, wherein to execute the memory access command, the processing device is to perform operations further comprising:

converting the memory access command into one or more translation units (TUs);

identifying a pointer associated with each respective TU of the one or more TUs; and executing a respective TU of the one or more TUs using the pointer associated with the respective TU.

17. The non-transitory computer-readable storage medium of claim 16, wherein the processing device is to perform operations further comprising:

determining that each TU of the one or more TUs is executed; and sending a notification of completion of execution of the one or more TUs.

18. The non-transitory computer-readable storage medium of claim 14, wherein the processing device is to perform operations further comprising:

sending an interrupt message to a firmware component, wherein the interrupt message indicates the completion of execution of the memory access command.

19. The non-transitory computer-readable storage medium of claim 14, wherein the processing device is to perform operations further comprising:

determining that the size of the memory access command does not satisfy the threshold criterion;

responsive to determining that the size of the memory access command does not satisfy the threshold criterion, sending an interrupt message to a firmware component of the memory device;

receiving, from the firmware component, a plurality of segments of the memory access command; and executing the plurality of segments of the memory access command using the hardware component of the memory device.

20. The non-transitory computer-readable storage medium of claim 14, wherein to notify the host system of the completion of the execution of the memory access command, the processing device is to perform operations further comprising:

updating an entry of a data structure associated with the host system with a notification of the completion of the execution of the memory access command; and sending an interrupt message to the host system, wherein the interrupt message indicates the updated entry of the data structure.

* * * * *